Figure 3:
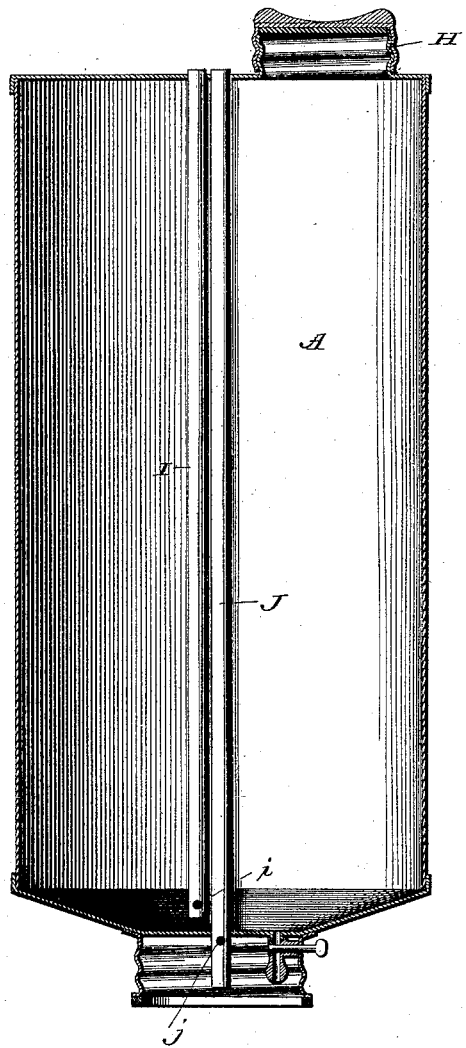

(No Model.) 2 Sheets—Sheet 1.
S. E. COOK.
RESERVOIR SYRINGE.
No. 430,514. Patented June 17, 1890.
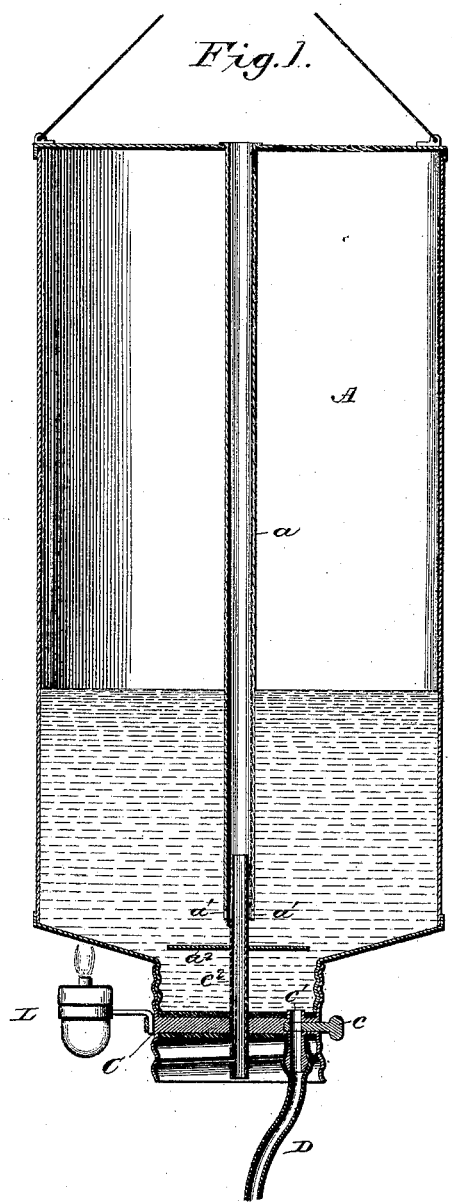
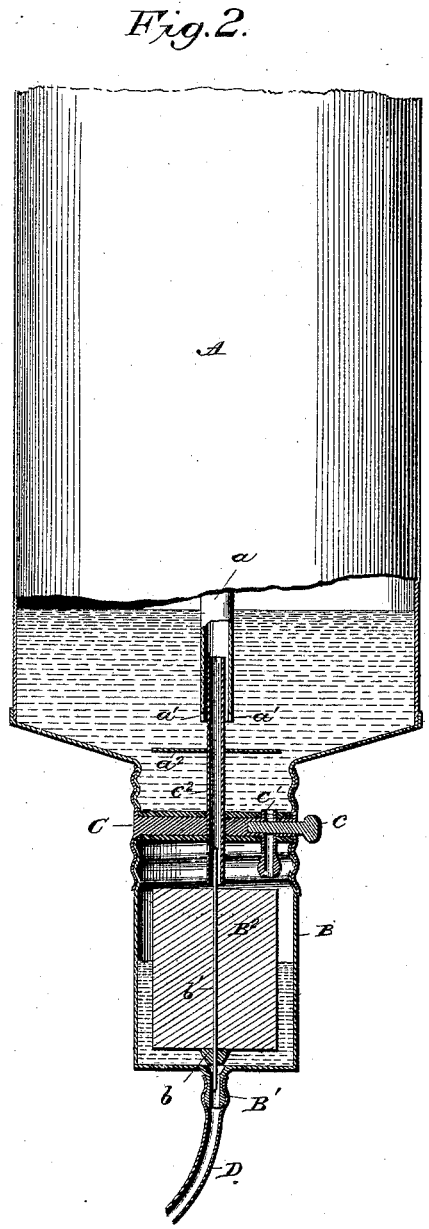
Witnesses
G. S. Elliott.
E. M. Johnson
Sheldon E. Cook.
Inventor
By his Attorney (No Model.)
2 Sheets—Sheet 2.

S. E. COOK.
RESERVOIR SYRINGE.

No. 430,514.  Patented June 17, 1890.

Witnesses
L. S. Elliott.
E. M. Johnson

Sheldon E. Cook,
Inventor
By his Attorney

UNITED STATES PATENT OFFICE.

SHELDON E. COOK, OF HOLDREGE, NEBRASKA.

RESERVOIR-SYRINGE.

SPECIFICATION forming part of Letters Patent No. 430,514, dated June 17, 1890.

Application filed November 30, 1889. Serial No. 332,079. (No model.)

*To all whom it may concern:*

Be it known that I, SHELDON E. COOK, a subject of the Queen of Great Britain, residing at Holdrege, in the county of Phelps and State of Nebraska, have invented certain new and useful Improvements in Reservoirs for Syringes and Douches; and I do hereby declare the following to be a full, clear, and exact description of the invention, such as will enable others skilled in the art to which it appertains to make and use the same, reference being had to the accompanying drawings and to letters of reference marked thereon, which form a part of this specification.
This invention relates to certain new and useful improvements in reservoir syringes or douches.

The object of the invention is to provide a supply-tank or liquid-holder having certain attachments which will cause either an even flow from the reservoir to the douche or syringe, or by means of its attachments provide a pulsating or intermittent flow, as will be hereinafter fully set forth and particularly claimed.
My invention also consists in providing such a reservoir with a cap or stopper provided with an opening through which the liquid may flow, and also with a tube which enters the air-inlet pipe of the reservoir; further, in providing the reservoir with a detachable float carrying a valve, whereby an intermittent or pulsating flow can be had.

In the accompanying drawings, Figure 1 is a vertical section of a reservoir and attachments therefor constructed in accordance with my invention. Fig. 2 is a similar view showing the float or attachment for causing an intermittent flow, and Fig. 3 is a modification of the device shown in Fig. 1.
The device embodying my invention is adapted to be applied to gravity-douches for washing out canals of human or animal bodies, wounds, inflamed surfaces, or cavities with hot or cold water or medicated solutions, and is designed to produce an even flow with or without an intermitting or pulsating current. Ordinarily the stream or flow of liquid is continuous, but may be made intermittent by the attachment of the devices shown in Fig. 2, and when the reservoir is not in use the nozzle, hose, &c., may be stored inside the reservoir, thus making the device more compact and portable.

My device is made up of three parts—viz., the reservoir, the portion inclosing the float, and connecting part or stopper for the reservoir.

In the drawings, Fig. 1 illustrates the device arranged to produce a continuous current, the float or attachment for producing an intermittent flow being detached and the hose connected directly to the nipple.

The reservoir A consists, preferably, of a can, ovoid or oval in cross-section, having a flat top and a bottom which slopes slightly toward the center, where it is provided with a circular opening with a depending screw-threaded rim. This can or reservoir A is provided with a rigid depending tube $a$, the upper end of which is open, while its lower extremity is provided with notches $a'$, and to the lower end of the tube $a$ is secured a plate $a^2$.

The reservoir A for the purpose of retaining the initial temperature of the fluid contained therein, as well as in the casing for the float, may be covered with non-conducting material, as felt or cloth, or a bracket and lamp may be used for this purpose; and the reservoir is provided with hooks or loops for suspending the same.

To the screw-treaded rim of the reservoir is removably attached a disk C, which is of sufficient thickness to receive a stop-cock $c$, which intersects an opening or tube $c'$, provided at its lower end with a nipple or enlargement. Through this tube $c'$ flows the liquid from the reservoir A to the float-receptacle or to the discharge-spout. The disk C is provided on its periphery with screw-threaded flanges, which are adapted to engage with the screw-threaded cap at the base of the reservoir and also with the screw-threaded upper end of the float-containing receptacle. The disk is further provided centrally with an opening, through which passes a tube $c^2$, said tube being attached rigidly to the disk, its lower end extending below the disk for a considerable distance, as shown, while its upper end passes through the plate $a^2$ into the pipe or tube $a$, it being essential that the upper end thereof should be located some distance above the notches $a'$. Washers, suitably perforated, are placed on each side of the disk C to make water-tight connections between the parts.

The float-containing casing B is preferably made up of a metallic circular can, the upper rim of which is screw-threaded, and it is provided centrally at its base with a valve-seat and nipple $B'$.

$B^2$ refers to the cylindrical float, which is provided centrally with a rod $b'$, which projects above the upper end of said float, the lower end of the rod carrying a valve $b$.

D refers to the discharge-tube, which can be connected either to the nipple $c'$ or to the nipple $B'$.

To operate the device the connecting portion or disk C is unscrewed from the reservoir A and said reservoir inverted and filled, after which the closing-cap is replaced and screwed to make a water-tight joint. The reservoir is then turned to an upright position, the thumb or finger being placed over the open end of the tube $a$. Now if a continuous current is desired the hose D is attached to the nipple $c'$ and the stop-cock turned, so that the reservoir will communicate therewith. The height of the can or receptacle A above the syringe nozzle or douche determines the force of the current, and it will remain at that point so long as the relation is not disturbed until the fluid in the reservoir falls to a line with the openings $a'$, when the reservoir is practically empty. The column of fluid above the openings being balanced by the atmospheric pressure produces no effect upon the stream otherwise than by furnishing a supply to replenish that which escapes through the stop-cock and nozzle. A vacuum in the reservoir above the fluid is prevented by the air entering in a downward current through the tube and bubbling upward to the top of the fluid. Should an intermittent current be desired, the receptacle B containing the float is attached to the lower screw-threaded flange, the rod $b'$ being placed in the lower end of the tube $c^2$, the hose being attached to the nipple at the base of the can. The stop-cock is opened, so that the fluid can escape through the nozzle of the can B faster than it enters from the reservoir above. After the air is forced out of the receptacle B the action is as follows: The valve $b$, being closed, is kept in position by two forces acting downwardly—viz., the weight of the valve and float and the weight of the fluid in the hose. Acting against these forces is the buoyancy of the float, which, however, is insufficient to open the valve until the fluid rises to a sufficient height in the receptacle B. This soon occurs, and the upward force becomes the greater, causing the valve to move off its seat. The opening of the valve transfers the weight of the fluid in the hose from the valve to the fluid in the receptacle B and pulls it downward with a rush. When the fluid in the float-containing receptacle is lowered sufficiently, the valve is closed to stop the flow. This action repeats itself indefinitely, so long as the fluid can escape from the float-receptacle faster than it can enter the same from the reservoir A. The flow through the nozzle is regularly intermittent. By properly adjusting the stop-cock the length of time between each flow or pulsation can be adjusted, while the height of the reservoir B above the nozzle determines the force of each beat. Should the fluid enter through the stop-cock faster than it can escape through the hose or discharge-pipe, a continuous current results. The lower portion of the tube $c^2$ allows the entrance and escape of air from the lower reservoir as the fluid rises and falls therein, and it should be long enough to reach above the level of the fluid in the tube $a$, so as to prevent the fluid from entering through it. Its lower end also serves to keep the float in position. With this device it is impossible to inject air. The plate $a^2$ directs the air-bubbles upward beyond the influence of the current.

Heretofore the continuous current obtained from a gravity-reservoir has not been uniform or even, but has been a gradually-diminishing one, due to the fact that the force was due to the height of the column of fluid in the reservoir, which is variable as the fluid lowers therein. My invention overcomes this defect by having the force of the stream governed from the bottom of the reservoir, which being invariable produces an even flow. Such a current is very desirable, especially where but slight force is required. In many cases an intermittent or pulsating stream is best, which heretofore has made it necessary to employ a bulb-syringe, which is unhandy and dangerous, as air is likely to be injected. My device produces the desired current in a handy, certain, and safe manner without any risk of injecting air, and dispenses with the necessity of employing a second person to operate the instrument.

In Fig. 3 I have shown an arrangement whereby the plate can be dispensed with as well as the notched tube, and in lieu thereof I provide the receptacle at its upper portion with a threaded flange and a cap H, through the medium of which the can may be filled, and this can is provided with a central tube I, which is open at its upper end and extends to near the bottom of the receptacle, where the end thereof is closed and provided with perforations $i$. The can is also provided with a tube J, which extends through the bottom of the can and is provided with perforations $j$ located within the lower screw-threaded cap. When this construction is employed, air will enter the interior of the receptacle through the tube I and also to the float-containing chamber, when such is used, through the tube J.

The disk C is preferably provided, as shown in Fig. 1, with a socket adapted to receive a bracket for supporting a lamp L, which when lighted will maintain the temperature of the fluid contained in the receptacle A.

Having thus described my invention, what I claim as new, and desire to secure by Letters Patent, is—

1. In combination with a douche, a reservoir provided with a vent-tube opening at the top of said reservoir and extending to near the bottom thereof, said reservoir having an egress-opening below the vent-tube, and a plate located below the vent-tube and above the egress-opening, substantially as shown, and for the purpose set forth.

2. In combination with a reservoir A, having a central depending tube open at both ends, a removable stopper provided with a tube which enters the lower end of the tube $a$, and a stop-cock to which the discharge-nozzle is attached, substantially as shown, and for the purpose set forth.

3. In combination with a reservoir A, having a central air-inlet tube $a$, a removable stopper therefor, provided with a stop-cock and exit nozzle, and a central tube, one end of which extends within the tube $a$, and a truncated cone adapted to encircle the lower end of the tube $a$, substantially as shown.

4. In combination with a reservoir A, having a central vent-tube $a$, closer for said reservoir, provided with a central tube and an egress-opening, a casing B, having a valve-seat at its base, and a valved float, substantially as shown, and for the purpose set forth.

5. In combination with a reservoir A, having an air-vent and discharge-opening, a reservoir having a valve-seat and valved float, a tube communicating with the vent-pipe $a$ of the upper reservoir and with the upper portion of the reservoir B, substantially as shown.

6. In combination with a reservoir A, having a central vent-tube and a screw-threaded opening, a disk carrying a tube which extends on each side of said disk, an egress-opening having a nozzle and cut-off, a reservoir B, containing a valved float $B^2$ and a stem $b'$, which is adapted to enter the lower end of the tube $c^2$, and a discharge-pipe D, the parts being combined and organized substantially as shown, and for the purpose set forth.

7. In combination with a reservoir A, having a central vent-tube opening at its lower end within the reservoir, a second tube-opening within the float-chamber, and a pipe or tube having a valve which communicates with the reservoir, substantially as shown, and for the purpose set forth.

8. In combination with a reservoir A, constructed substantially as shown, and for the purpose set forth, a bracket adapted to carry a lamp for heating the contents of said reservoir, for the purpose set forth.

In testimony whereof I affix my signature in presence of two witnesses.

SHELDON E. COOK.

Witnesses:
N. E. JOHNSON,
H. SEWELL.